United States Patent [19]

Sasaki et al.

[11] Patent Number: 5,082,426
[45] Date of Patent: Jan. 21, 1992

[54] JET PUMP STRUCTURE FOR A FUEL TANK

[75] Inventors: Michiaki Sasaki; Kiyokazu Yamamoto; Toshiyuki Matsuki, all of Kanagawa, Japan

[73] Assignees: Nissan Motor Company, Limited; Jidosha Denki Kogyo Kabushiki Kaisha, both of Yokohama, Japan

[21] Appl. No.: 379,784

[22] Filed: Jul. 14, 1989

[30] Foreign Application Priority Data

Jul. 15, 1988 [JP] Japan ................................. 63-176497

[51] Int. Cl.[5] ............................................. F04F 5/44
[52] U.S. Cl. .................................. 417/198; 180/314; 417/194
[58] Field of Search ................. 180/314; 417/151, 194, 417/198; 137/571, 147, 574

[56] References Cited

U.S. PATENT DOCUMENTS 2,953,156  9/1960  Bryant ................................. 137/571
4,834,132  5/1989  Sasaki et al. ...................... 417/198 X

FOREIGN PATENT DOCUMENTS 197684  3/1924  United Kingdom ............... 417/194

Primary Examiner—Richard A. Bertsch
Assistant Examiner—Michael I. Kocharov
Attorney, Agent, or Firm—Foley & Lardner

[57] ABSTRACT

A jet pump structure for a fuel tank having first and second chambers therein includes first, second and third fuel pipes all of which are connected to a vacuum chamber provided within the fuel tank. The first pipe returns oversupplied fuel into the vacuum chamber, the second pipe transfers fuel stored in the first chamber into the vacuum chamber, and the third pipe receives the fuel from the first and second pipes and discharge same into the second chamber. A flow guide member is provided within the first pipe, which receives the oversupplied fuel to form same into a swirl flow. The swirl flow is ejected from the first pipe as a jet flow into the vacuum chamber to provide a vacuum therearound within the vacuum chamber. The ejected swirl flow further works to seal the vacuum chamber against the third pipe so that the vacuum generated within the vacuum chamber is prevented from being released through the third pipe to effectively suck the fuel from the first chamber. The sucked fuel joins the ejected swirl flow and is discharged into the second chamber through the third pipe.

5 Claims, 3 Drawing Sheets 5,082,426

JET PUMP STRUCTURE FOR A FUEL TANK

BACKGROUND OF THE INVENTION

1. Field of the Invention

The present invention relates generally to a jet pump structure for a fuel tank installed in a vehicle such as an automobile vehicle. More specifically, the present invention relates to a jet pump structure for a fuel tank having first and second fuel chambers therein, wherein fuel stored in the first chamber is effectively transferred to the second chamber using jet swirl flows of return fuel which has been oversupplied to an engine.

2. Description of the Background Art

Recently, there has been a large demand for effective layout of a fuel tank so as to enlarge so-called utility space particularly in a passenger car. To satisfy this demand, there has been a type of the fuel tank which straddles the driving system components or the exhaust system components at its bottom portion.

For example, Japanese Utility Model Publication (Jikkai Sho) 57-109921 discloses a fuel tank structure having a bottom wall which projects inwardly so as to avoid interference between the tank bottom wall and other functional parts.

In this type of the fuel tank, however, since a main fuel chamber and an auxiliary fuel chamber are formed at its lower section by the inward projection of the bottom wall, it is necessary to provide an arrangement which prevents the fuel from remaining within one of the chambers being non-used. For example, a fuel feed pipe should be bifurcated into the main and auxiliary chambers through a switching valve such that when the fuel stored in the main chamber runs out, the switching valve is actuated to supply the fuel in the auxiliary chamber to the engine.

Accordingly, the structure requires the switching valve and other units such as a liquid level gauge and a control unit for actuating the switching valve automatically, which is very costly and complicated.

SUMMARY OF THE INVENTION

Therefore, it is an object of the present invention to provide a jet pump structure for a fuel tank having first and second fuel chambers therein, which effectively transfers fuel stored in the first fuel chamber to the second fuel chamber without using the switching valve and its control units.

Another object of the present invention is to provide a jet pump structure for a fuel tank having first and second fuel chambers therein, which effectively transfers fuel stored in the first fuel chamber into the second fuel chamber over sufficiently wide ranges of return fuel flow rates with simple and low-priced structure.

A further object of the present invention is to provide a jet pump structure for a fuel tank having first and second fuel chambers therein, which effectively transfers fuel stored in the first fuel chamber into the second fuel chamber under all the engine operating conditions with simple and low-priced structure.

To accomplish the above-mentioned and other objects, according to one aspect of the present invention, a jet pump structure for a fuel tank having first and second fuel chambers therein comprises a vacuum chamber provided within the fuel tank, first means connected to the vacuum chamber for returning oversupplied fuel into the vacuum chamber, second means connected to the vacuum chamber for transferring fuel stored in the first chamber into the vacuum chamber, third means connected to the vacuum chamber for receiving the fuel from the first and second means and introducing the same into the second chamber, fourth means provided within the first means for receiving said oversupplied fuel to form the same into a swirl flow, the swirl flow being ejected from the first means as a jet swirl flow into the vacuum chamber so as to provide a vacuum therearound within the vacuum chamber, the ejected swirl flow further working to seal the vacuum chamber against the third means so as to prevent the vacuum generated within the vacuum chamber from being released through the third means such that the vacuum effectively sucks the fuel from the first chamber through the second means.

According to another aspect of the present invention, a jet pump structure for a fuel tank having first and second chambers therein comprises a vacuum chamber provided within the fuel tank, a fuel return pipe connected to the vacuum chamber for returning oversupplied fuel into the vacuum chamber, the fuel return pipe having a tapered portion at its lower end, the tapered portion working as a nozzle to eject the oversupplied fuel into the vacuum chamber, a fuel transfer pipe connected to the vacuum chamber for transferring fuel stored in the first chamber into the vacuum chamber, a throat pipe connected to the vacuum chamber for receiving the fuel from the fuel return pipe and the fuel transfer pipe to introduce same into the second chamber, a flow guide member provided within the fuel return pipe, the flow guide member receiving the oversupplied fuel to form same into a swirl flow, the swirl flow being ejected from the nozzle as a jet swirl flow into the vacuum chamber to provide a vacuum therearound within the vacuum chamber, the ejected jet swirl flow further working to contact with an inner wall of the throat pipe at its inlet so as to seal the vacuum chamber against the throat pipe such that the vacuum generated within the vacuum chamber is prevented from being released to effectively suck the fuel from the first chamber through the fuel transfer pipe.

The flow guide member may comprise a base and a pair of wings which extend from opposite sides of the base and toward opposite directions to each other, each wing extending at a predetermined angle with respect to the vertical line and guiding the oversupplied fuel into the downstream side to form the same into swirl flows which are then ejected from the nozzle.

The tappered portion of the fuel return pipe may be encircled by the vacuum chamber.

The flow guide member may be positioned just above the tapered portion of the fuel return pipe.

Preferably, the predetermined angle of each wing the respect to the vertical line is 30° to 60° , an inner diameter of a lower end of the tapered portion of the fuel return pipe is 1.2 mm to 1.5 mm, a length of the throat pipe is 5 mm to 20 mm, a length of a clearance between the lower end of the tapered portion and an upper end of throat pipe is equal to or less than 4 mm, and a ratio of an inner diameter of the throat pipe to the inner diameter of the lower end of the tapered portion is 1.4 to 3.2.

Preferably, the vacuum chamber includes a tapered portion connected to the upper end of the throat pipe, the tapered portion of the vacuum chamber working as a venturi pipe in cooperation with the tapered portion of the fuel return pipe to accelerate the fuel which is sucked into the vacuum chamber by the vacuum from the first chamber and passes therethrough, the accelerated fuel joining the ejected swirl flows to be introduced into the second chamber through the throat pipe.

BRIEF DESCRIPTION OF THE DRAWINGS

The present invention will be understood more fully from the detailed description given herebelow and from the accompanying drawings of the preferred embodiment of the invention, which are given by way of example only, and are not intended to be limitative of the present invention.

In the drawings.

DESCRIPTION OF THE PREFERRED EMBODIMENT

Referring now to FIGS. 1 to 4, there is illustrated a preferred embodiment of a jet pump structure 1 according to the present invention.

Figure 2:
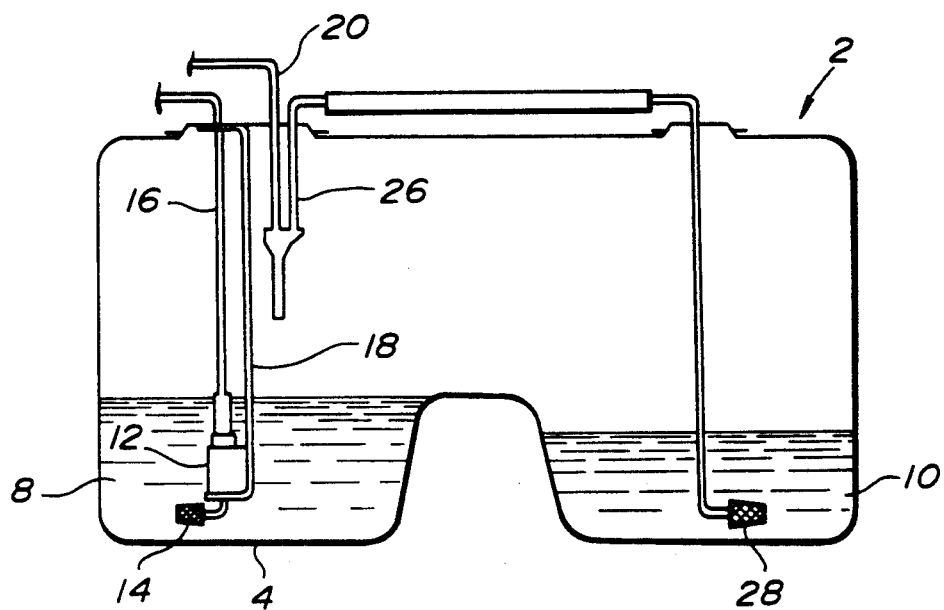
FIG. 2 is a schematic sectional view showing a fuel tank provided with the jet pump structure of FIG. 1.

In FIG. 2, a fuel tank body 2 has its bottom 4 which is formed with an inward projection 6 across the width of the bottom 4. The inward projection 6 defines a main chamber 8 and an auxiliary chamber 10 at the lower portion of the fuel tank body 2.

In the main chamber 8, a fuel feed pump 12 is provided to feed the fuel into the fuel supply system (not shown) through a filter 14 and a fuel feed pipe 16. The fuel feed pump 12 and the filter 14 are fixedly mounted within the tank body 2 by an elongate mounting member 18.

Figure 1:
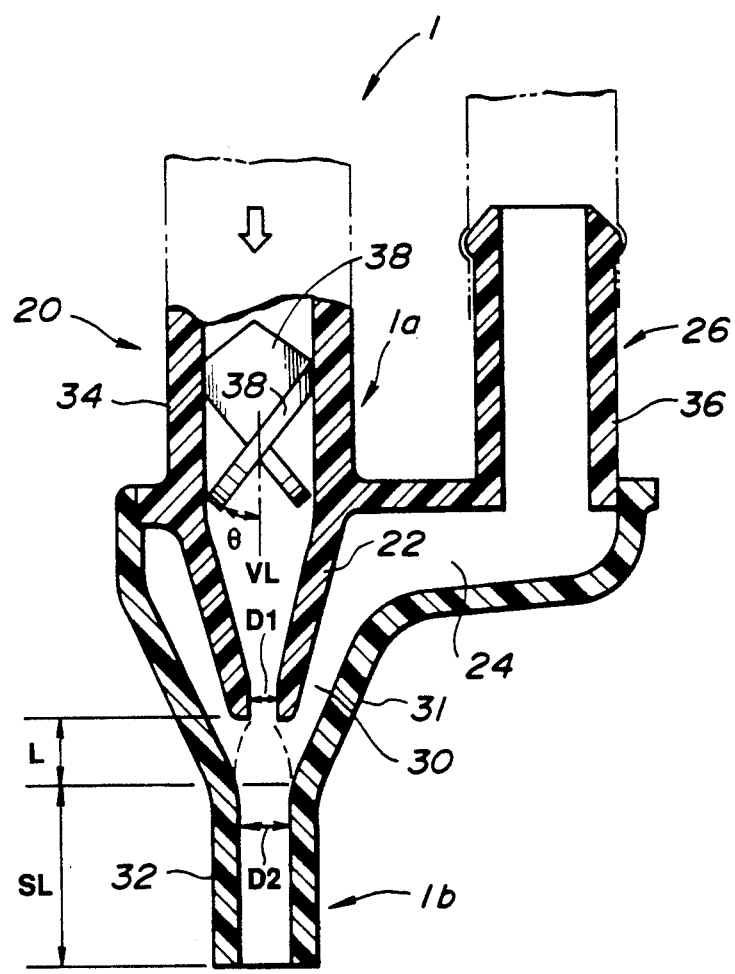
FIG. 1 is a sectional view showing a jet pump structure according a preferred embodiment of the present invention.

A fuel return pipe 20 is provided in the tank body 2 extending in parallel to the upper portion of the fuel feed pipe 16 for recirculating into the fuel tank body 2 the fuel which has been oversupplied to the engine (not shown) via the fuel feed pipe 16. As shown in FIG. 1, the lower end of the fuel return pipe 20 is formed tapered so as to work as a nozzle for ejecting the fuel as a jet flow to provide a vacuum around the jet flow.

A vacuum chamber 24 is provided encircling the nozzle 22 gas/liquid-tightly therebetween. A fuel transfer pipe 26 is connected to the vacuum chamber 24 gas/liquid-tightly therebetween for transferring the fuel stored in the auxiliary chamber 10 to the main chamber 8 through a filter 28. The vacuum chamber has a tapered portion 30 at its lower end. The walls 31 of the vacuum chamber 24 defining this tapered portion 30 works as a venturi tube in cooperation with the outer peripheries of the nozzle 22 so as to accelerate the fuel transferred into the vacuum chamber 24 through the transfer pipe 26.

A throat pipe 32 is connected to the vacuum chamber 24 gas/liquid-tightly therebetween, which just follows the walls 31 defining the tapered portion 30 of the vacuum chamber 24 for receiving the mixture of the fuels introduced from the nozzle 22 and the fuel transfer pipe 26 and discharging the same into the main chamber 8.

In this embodiment, the jet pump structure 1 is constituted by two pump components 1a and 1b. Specifically, the pump component 1a includes a return pipe outlet port 34 including the nozzle 22 and a transfer pipe outlet port 36, which are integrally formed altogether. The return pipe outlet port 34 including the nozzle 22 is formed separately from the other portion of the return pipe 20 and the transfer pipe outlet port 36 is separately formed from the other portion of the transfer pipe 26. The pump component 1b includes the throat pipe 32 and the walls 31 of the vacuum chamber 24, which are integrally formed altogether. The pump components 1a and 1b are fixedly connected to each other gas/liquid-tightly therebetween so as to provide the vacuum chamber 24 around the nozzle 22. Further, the upper ends of the return pipe outlet port 34 and the transfer pipe outlet port 36 can be easily fitted into the other portions of the return pipe 20 and the transfer pipe 26, respectively, so that it is quite simple and easy to assemble the jet pump unit 1 itself and further to fix the same within the fuel tank body 2.

Figure 3:
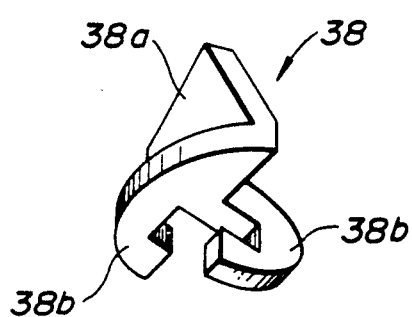
FIG. 3 is a perspective view showing a flow guide member as used in the jet pump structure of FIG. 1.
Figure 4:
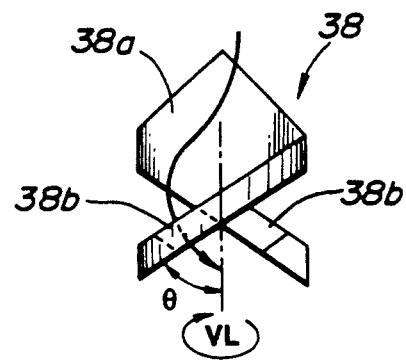
FIG. 4 is a side elevational view showing the flow guide member of FIG. 3.

A flow guide member 38 is provided in the fuel return pipe 20 at the outlet port 34 just above the nozzle 22. As shown in FIGS. 3 and 4, the flow guide member 38 has base 38a and a pair of wings 38b. The wings 38b extend from opposite sides of the base 38a and toward opposite directions at a predetermined angle $\theta$ with respect to the vertical line VL. Each wing 38b is similar to "semicircle" in shape and an arc of each wing 38b is shaped to just follow the corresponding inner wall of the fuel return pipe 20. Each wing 38b is formed with a cut-out 39 at its downstream end portion.

As shown in FIG. 1, the flow guide member 38 is fixedly arranged within the outlet port 34 of the fuel return pipe 20 with the base 38a positioned upstream of the return fuel flow with respect to the wings 38b. The flow guide member 38 receives the fuel returned through the return pipe 20 and guides same into the downstream side through the cut-outs formed at the wings 38b to form the same into swirl flows as shown by an arrow in FIG. 4. The swirl flows are then ejected from the nozzle 22. The swirl flows are then diffused to make its swirl radius larger so as to contact with the inner wall of the throat pipe 32 at its inlet portion as shown by dotted lines in FIG. 1. The ideal shape of the swirl flows between the lower end of the nozzle 22 and the upper end of the throat pipe 32 is a corn-shape having a cross-section of a circular shape, which is also seen from FIG. 1 as shown by the dotted lines.

By providing the flow guide member 38 in the fuel return pipe 20 just above the nozzle 22, the swirl flows ejected from the nozzle 22 are ensured to come into contact with the inner wall of the inlet portion of the throat pipe 32 even if the return fuel flow rate is relatively small so that the vacuum chamber 24 is tightly sealed from the atmospheric pressure through the throat pipe 32, i.e. from the atmospheric pressure within the fuel tank body 2. Accordingly, the vacuum generated by the jet swirl flows within the vacuum chamber 24 is ensured to effectively suck the fuel from the auxiliary chamber 10 through the transfer pipe 26. The sucked fuel which is accelerated through the venturi portion 30 joins the swirl flows to be discharged into the main chamber 8 through the throat pipe 32.

On the other hand, without the flow guide member 38 provided in the return pipe 20, when the jet flow rate discharged from the nozzle 22 is relatively small, the jet flow radius does not become large enough to contact with the inner wall of the throat pipe 32, so that no seal is provided for the vacuum chamber 24 to cause the prime suction of the fuel from the auxiliary chamber 10 impossible.

Accordingly, the jet pump structure according to this embodiment ensures the effective suction of the fuel from the auxiliary chamber 10 over sufficiently wide ranges of the return fuel flow rates. Further, the jet pump structure according to this embodiment ensures the rapidly responsive prime suction of the fuel as well as the shortened suction time for a unit amount of the fuel since the vacuum generated within the vacuum chamber 24 effectively sucks the fuel from the auxiliary chamber 10 without being released through the throat pipe 32.

For obtaining the required minimum flow rate of the fuel from the auxiliary chamber 10 into the main chamber 8 under all the engine operating conditions, various values have been selected as follows:

$\theta$: 30° to 60°
D1: 1.2 mm to 1.5 mm
SL: 5 mm to 20 mm
L: not more than 4 mm
D2/D1: 1.4 to 3.2

(wherein $\theta$ is an angle of each wing 38b with respect to the vertical line VL, D1 is an inner diameter of the nozzle 22, SL is a length of the throat pipe 32, L is a length of a clearance between the lower end of the nozzle 22 and the upper end of the throat pipe 32, and D2/D1 is a ratio of a throat pipe inner diameter to the nozzle inner diameter).

These values have been selected in the light of the following conditions.

As mentioned above, the ideal shape of the jet swirl flows between the lower end of the nozzle 22 and the upper end of the throat pipe 32 is a corn-shape having a cross-section of a circular shape. Specifically, this shape ensures the secure liquid seal for the vacuum chamber 24 against the atmospheric pressure through the throat pipe 32 to provide the rapidly responsive prime suction of the fuel from the auxiliary chamber 10 through the transfer pipe 26 and further ensures the smooth and responsive transfer of the sucked fuel into the main chamber 8 through the throat pipe 32 after the prime suction of the fuel, over the wide ranges of the return fuel flow rates between small and large. However, when the return fuel flow rate is minimum, it tends to happen that a cross section of the corn-shaped swirl flows is not formed circular. The angle $\theta$ has been selected to ensure the circular cross section of the swirl flows even under such a minimum flow rate. Specifically, when the angle $\theta$ is smaller than the selected values, the liquid seal of the vacuum chamber 24 is weakened so that the atmospheric pressure is introduced into the vacuum chamber 24 through the throat pipe 32 to reduce the jet pump effect. On the other hand, when the angle $\theta$ is larger than the selected values, the back pressure from the flow guide member 38 adversely affects injection valves of the engine to cause the engine speed unstable. Accordingly, the selected maximum value of the angle $\theta$ has been selected such that the back pressure from the flow guide member 38 is equal to the back pressure from the injection valves. The selected minimum and maximum values have been selected as the practical lower and upper limits considering the values of the other elements.

The return fuel flow rate is determined by difference between a fuel discharge rate of the feed pump 12 and actual engine consumption. Specifically, when the engine load is small such as at the engine idling, the return fuel flow rate is large, while when the engine load or speed is high, the return fuel flow rate is small. Further, when the engine temperature is high, the return fuel tends to become gas/liquid mixture flows. Accordingly, the return fuel flow rate varies widely depending on the engine operating conditions. Actual operating data which cover wide ranges of the engine operating conditions as well as of the fuel nature, have revealed that the minimum return fuel flow rate is 30 X/h.

On the other hand, the transfer flow rate of the fuel from the auxiliary chamber 10 to the main chamber 8 should satisfy the following formula since the fuel stored in the auxiliary chamber 10 should be consumed first.

$$Q2 \geq QE \cdot V2/(V1+V2)$$

(wherein, Q2 is a fuel transfer flow rate (X/h) from the auxiliary chamber 10, QE is engine fuel consumption (X/h), V1 is volume of the main chamber 8 (X), V2 is volume of the auxiliary chamber 10 (X))

The fuel tank actually installed in the current automotive cars generally has 40 X to 70 X volume. Accordingly, the volume of the main chamber 8 to that of the auxiliary chamber 10 should be at least 1:1 since the main chamber 8 is provided therein with the feed pump 12. Under these conditions, it has been confirmed that the minimum transfer fuel flow rate Q2 should be 8 X/h in order to prevent during the normal engine operation a lack of fuel in the main chamber 8 from which the engine is supplied even though there is still remaining fuel within the auxiliary chamber 10.

Figure 5:
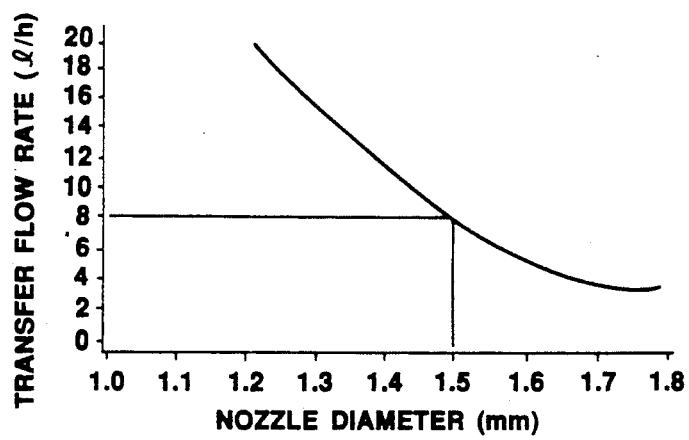
FIG. 5 is a diagram showing a relationship between a fuel transfer flow rate Q2 and a nozzle diameter D1.

The selected values D1, SL, L and D2/D1 as mentioned above are the optimum values which satisfy the required minimum transfer fuel flow rate Q2 under the minimum return flow rate. Specifically, as shown in FIG. 5, when the inner nozzle diameter D1 exceeds 1.5 mm, the transfer fuel flow rate Q2 becomes less than 8 X/h, and when the inner nozzle diameter D1 is less than 1.2 mm, the nozzle 22 tends to be chocked up with dust. Accordingly, the values 1.2 mm and 1.5 mm have been selected as the practical lower and upper limits.

When the length of the throat pipe 32 SL becomes less than 5 mm, the required minimum transfer fuel flow rate 8 X/h can not be attained with the fuel being in room temperature. Under room temperature of the fuel, as the length SL gets longer, the jet pump effect gets larger. However, when the fuel temperature becomes higher to around 80° C. by the heat transmitted from the engine, vacuum ebullition occurs in the swirled fuel ejected from the nozzle 22 so that vapor is generated which narrows the liquid flow path in the throat pipe 32 to cause the fuel transfer impossible. In the light of this, the length SL can not exceed 20 mm. Accordingly, the values 5 mm and 20 mm have been selected as the practical lower and upper limits.

Figure 6:
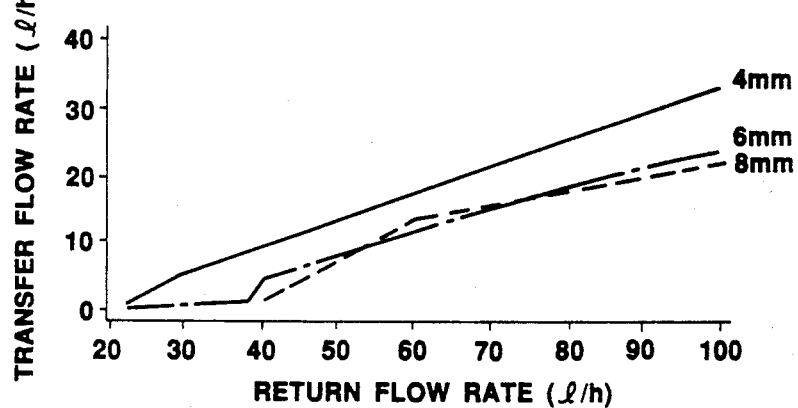
FIG. 6 is a diagram showing a relationship between a length of a clearance L between a nozzle lower end and a throat pipe upper end, and a fuel transfer flow rate Q2, with respect to return fuel flow rate.

As shown in FIG. 6, when the length of the clearance L is 4 mm, the required minimum transfer fuel flow rate (8 X/h) is attained even under the minimum return fuel flow rate (30 X/h). On the other hand, when the length L exceeds 4 mm, such as 6 mm or 8 mm, the required minimum transfer flow rate Q2 can not be obtained under the minimum return fuel flow rate. Accordingly, the value 4 mm has been selected as the practical upper limit.

Figure 7:
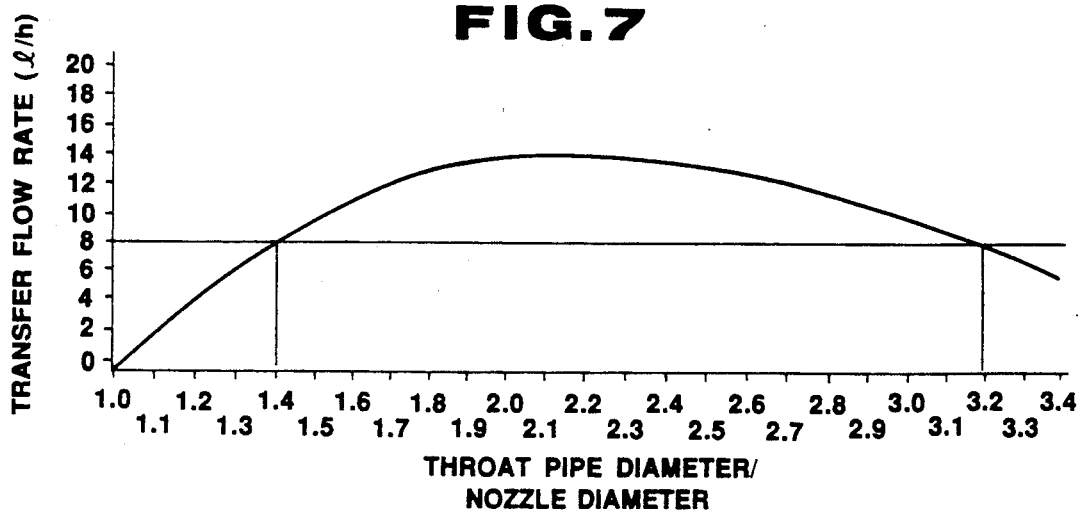
FIG. 7 is a diagram showing a relationship between a ratio D2/D1 (throat pipe diameter/nozzle diameter) and a fuel transfer flow rate Q2.

As shown in FIG. 7, when the ratio of the inner throat pipe diameter to the inner nozzle diameter D2/D1 is less than 1.4 or larger than 3.2, the required minimum transfer flow rate (8 X/h) can not be attained under the minimum return fuel flow rate (30 X/h). Accordingly, the values 1.4 and 3.2 have been selected as the practical lower and upper limits.

As understood from the above description, since the aforementioned selected values have been determined to provide the required minimum transfer flow rate Q2 (8 X/h) even under the minimum return flow rate (30 X/h), the jet pump structure ensures the smooth and secure fuel transfer from the auxiliary chamber to the main chamber under all the engine operating conditions to prevent a lack of fuel to in the main chamber from which the engine is supplied, even though there is still remaining fuel within the auxiliary chamber.

It is to be understood that the invention is not to be limited to the embodiments described above, and that various changes and modifications may be made without departing from the spirit and scope of the invention as defined in the appended claims.

What is claimed is:

1. A jet pump structure for a fuel tank having first and second chambers therein, comprising:
   a vacuum chamber provided within the fuel tank;
   a fuel return pipe connected to said vacuum chamber for returning oversupplied fuel into said vacuum chamber, said fuel return pipe having a tapered portion at its downstream end, said tapered portion working as a nozzle to eject said oversupplied fuel into said vacuum chamber;
   a fuel transfer pipe connected to said vacuum chamber for transferring fuel stored in said first chamber into said vacuum chamber;
   a throat pipe connected to said vacuum chamber for receiving the fuel from said fuel return pipe and said fuel transfer pipe to introduce said fuel into said second chamber;
   a flow guide member provided within said fuel return pipe, said flow guide member including a pair of wings which extend in opposite directions to cross with each other, each wing extending at a predetermined angle with respect to a vertical axis of said flow guide member for guiding said oversupplied fuel downstream thereof to form said oversupplied fuel into a swirl flow, said swirl flows being ejected from said nozzle as jet swirl flows into said vacuum chamber to provide a vacuum therearound within said vacuum chamber, said ejected jet swirl flow further working to seal said vacuum chamber against said throat pipe such that said vacuum generated within said vacuum chamber is prevented from being released through said throat pipe to effectively suck the fuel from said first chamber through said fuel transfer pipe; wherein
   said jet pump structure having a dimensional relationship such that said predetermined angle of each wing with respect to the vertical axis is 30° to 60°, an inner diameter of a downstream end of said tapered portion of the fuel return pipe is 1.2 mm to 1.5 mm, a length of said throat pipe is 5 mm to 20 mm, a length of a clearance between the downstream end of said tapered portion and an upstream end of said throat pipe is no more than 4 mm, and a ratio of said inner diameter of said throat pipe to said inner diameter of the downstream end of the tapered portion is 1.4 to 3.2.

2. A jet pump structure as set forth in claim 1, wherein each wing is formed with a cut-out at its downstream end portion, said oversupplied fuel being guided into the downstream side passing through said cut-out.

3. A jet pump structure as set forth in claim 2, wherein said throat pipe has a constant inner diameter adjacent said upstream end.

4. A jet pump structure as set forth in claim 3, wherein an inlet of said fuel transfer pipe into said vaccum chamber is arranged below said flow guide member.

5. A jet pump structure as set forth in claim 1, wherein each wing is substantially "semicircular" in shape.

* * * * *